US010832369B2

(12) United States Patent
Rintala et al.

(10) Patent No.: US 10,832,369 B2
(45) Date of Patent: Nov. 10, 2020

(54) METHOD AND APPARATUS FOR DETERMINING THE CAPTURE MODE FOLLOWING CAPTURE OF THE CONTENT

(71) Applicant: Nokia Technologies Oy, Espoo (FI)

(72) Inventors: Jasmine Rintala, London (GB); Giovanni Cannata, London (GB); Craig Pugsley, Bristol (GB); Samuel Clarke, London (GB); Laura Cavanagh, London (GB); Gernot Preslmayer, London (GB); Katie Wharton, London (GB)

(73) Assignee: Nokia Technologies Oy, Espoo (FI)

( * ) Notice: Subject to any disclaimer, the term of this patent is extended or adjusted under 35 U.S.C. 154(b) by 109 days.

(21) Appl. No.: 15/520,331

(22) PCT Filed: Oct. 29, 2015

(86) PCT No.: PCT/IB2015/058365
§ 371 (c)(1),
(2) Date: Apr. 19, 2017

(87) PCT Pub. No.: WO2016/067248
PCT Pub. Date: May 6, 2016

(65) Prior Publication Data
US 2017/0330302 A1 Nov. 16, 2017

(30) Foreign Application Priority Data
Oct. 29, 2014 (GB) .................................. 1419258.7

(51) Int. Cl.
*G06K 9/36* (2006.01)
*G06T 1/00* (2006.01)
(Continued)

(52) U.S. Cl.
CPC ............ *G06T 1/0007* (2013.01); *G06T 13/80* (2013.01); *H04N 5/23216* (2013.01);
(Continued)

(58) Field of Classification Search
CPC ............... H04N 19/17; H04N 21/4223; G06K 2009/00738; G06K 9/3216; G06K 9/3233;
(Continued)

(56) References Cited

U.S. PATENT DOCUMENTS 5,497,193 A * 3/1996 Mitsuhashi ........ H04N 1/00397
348/231.99
5,687,259 A * 11/1997 Linford ................. G06T 11/203
345/632
(Continued)

FOREIGN PATENT DOCUMENTS

WO WO-2004081852 A1 * 9/2004 ......... G06K 9/00033

OTHER PUBLICATIONS

Exapanding he digital cameras reach, Chandra Narayanaswami et al., IEEE, 0018-9162-04, 2004, pp. 65-73 (Year: 2004).*
(Continued)

Primary Examiner — Jayesh A Patel
(74) Attorney, Agent, or Firm — Alston & Bird LLP

(57) ABSTRACT

A method, apparatus and computer program product are provided to permit the capture mode to be determined following the capture of the content. In the context of a method, content may be initially captured, such as without an indication of the capture mode. Following capture of the content, the method includes determining one or more candidate capture modes from a plurality of capture modes based upon information associated with the content that has been captured. The method also includes causing the one or more candidates capture modes to be presented to a user for
(Continued)

selection. A corresponding apparatus and computer program product are also provided.

19 Claims, 8 Drawing Sheets

(51) Int. Cl.
  *H04N 5/232* (2006.01)
  *G06T 13/80* (2011.01)
  *H04N 5/77* (2006.01)
  *H04N 9/82* (2006.01)
(52) U.S. Cl.
  CPC ........... *H04N 5/23222* (2013.01); *H04N 5/77* (2013.01); *H04N 5/772* (2013.01); *H04N 9/8205* (2013.01)
(58) Field of Classification Search
  CPC ............ G06K 9/46; G06T 2207/10016; G06T 1/0007
  See application file for complete search history.

(56) References Cited

U.S. PATENT DOCUMENTS

| | | | | |
|---|---|---|---|---|
| 6,122,003 A * | 9/2000 | Anderson | .......... | H04N 1/00397 348/207.99 |
| 6,359,649 B1 * | 3/2002 | Suzuki | .................. | H04N 5/225 348/220.1 |
| 7,760,239 B2 * | 7/2010 | Kim | ..................... | H04N 5/4401 348/14.01 |
| 8,102,457 B1 * | 1/2012 | Anderson | ............ | H04N 1/0044 348/333.01 |
| 8,127,232 B2 * | 2/2012 | Pavley | ................. | G11B 27/034 715/747 |
| 8,310,582 B2 * | 11/2012 | Yoon | ..................... | H04N 5/772 345/635 |
| 8,687,081 B2 * | 4/2014 | Kwon | ................ | H04N 5/23245 348/222.1 |
| 9,055,214 B2 * | 6/2015 | Yang | .................... | H04N 9/8205 |
| 9,148,618 B2 * | 9/2015 | Matas | ................ | H04N 5/23293 |
| 9,204,051 B2 * | 12/2015 | Masugi | ............. | H04N 5/23216 |
| 10,051,175 B2 * | 8/2018 | Kim | ..................... | H04N 5/2624 |
| 2002/0047906 A1 * | 4/2002 | Ohta | ................. | H04N 5/23248 348/208.99 |
| 2004/0090533 A1 * | 5/2004 | Dow | ................. | H04N 5/23245 348/220.1 |
| 2007/0109429 A1 * | 5/2007 | Suzuki | ............... | H04N 5/23293 348/231.99 |
| 2007/0263112 A1 | 11/2007 | Shinkai | | |
| 2009/0073285 A1 * | 3/2009 | Terashima | ......... | H04N 5/23245 348/231.99 |
| 2009/0087099 A1 | 4/2009 | Nakamura | | |
| 2010/0182324 A1 * | 7/2010 | Ko | .......... | G06T 13/80 345/473 |
| 2011/0058738 A1 * | 3/2011 | Miyazawa | .............. | G06T 5/008 382/168 |
| 2011/0074971 A1 * | 3/2011 | Kwon | ................ | H04N 5/23245 348/222.1 |
| 2011/0134260 A1 * | 6/2011 | Cho | ........................ | H04N 5/232 348/220.1 |
| 2011/0216209 A1 * | 9/2011 | Fredlund | ............... | G01S 3/7864 348/211.99 |
| 2011/0228075 A1 * | 9/2011 | Madden | ................ | G03B 15/05 348/81 |
| 2011/0267492 A1 * | 11/2011 | Prentice | ................ | H04N 5/232 348/223.1 |
| 2012/0019704 A1 * | 1/2012 | Levey | ................ | H04N 5/23241 348/335 |
| 2012/0070097 A1 * | 3/2012 | Adams, Jr. | ......... | H04N 5/23229 382/255 |
| 2012/0162459 A1 * | 6/2012 | Cheng | .................... | H04N 5/2621 348/222.1 |
| 2012/0249853 A1 * | 10/2012 | Krolczyk | ............. | H04N 1/2145 348/333.01 |
| 2012/0257071 A1 * | 10/2012 | Prentice | ............ | H04N 5/23238 348/220.1 |
| 2013/0027569 A1 * | 1/2013 | Parulski | ............. | H04N 5/23219 348/207.1 |
| 2013/0235224 A1 * | 9/2013 | Park | .................... | H04N 5/23222 348/218.1 |
| 2013/0300750 A1 | 11/2013 | Mishra et al. | | |
| 2014/0028885 A1 | 1/2014 | Ma et al. | | |
| 2014/0085487 A1 * | 3/2014 | Park | .................... | H04N 5/23293 348/207.1 |
| 2014/0092260 A1 * | 4/2014 | Escobedo | .......... | H04N 5/23206 348/207.1 |
| 2014/0184852 A1 | 7/2014 | Niemi et al. | | |
| 2014/0211065 A1 * | 7/2014 | Sudheendra | ......... | H04N 1/2112 348/333.02 |
| 2014/0218554 A1 * | 8/2014 | Yang | ..................... | H04N 1/215 348/220.1 |
| 2015/0178318 A1 * | 6/2015 | Lee | ...................... | H04N 1/2116 348/231.3 |
| 2017/0019596 A1 * | 1/2017 | Dunn | .................... | H04N 5/2328 |
| 2017/0019604 A1 * | 1/2017 | Kim | ................... | H04N 5/23238 |
| 2017/0289462 A1 * | 10/2017 | Eum | ................... | H04N 5/23293 |

OTHER PUBLICATIONS

International Search Report and Written Opinion for Application No. PCT/IB2015/058365 dated Jan. 28, 2016.
Search Report for Great Britain Application No. GB 1419258.7 dated Apr. 30, 2015.
Office Action for European Application No. 15 790 687.6 dated Dec. 17, 2019, 10 pages.

* cited by examiner

METHOD AND APPARATUS FOR DETERMINING THE CAPTURE MODE FOLLOWING CAPTURE OF THE CONTENT

TECHNOLOGICAL FIELD

An example embodiment of the present invention relates generally to capturing content in accordance with one or more capture modes and, more particularly, to determining the capture mode following the capture of the content.

BACKGROUND

The ubiquitous nature of smartphones, tablet computers and other electronic devices that include cameras, microphones or other devices for capturing content allow for ever increasing amounts of content to be captured. A wide variety of content may be captured including, for example, video content, audio content, audio/video content and other forms of content. The content that is captured may be saved for subsequent replay, posted or otherwise shared with other users or consumed in other manners.

In addition to the increased quantity of content that is captured, the capture modes that define the manner in which the content is saved have also multiplied. With respect to video content, for example, video content may be saved as a video, a still image, a cinemagraph, a best photo, an action photo, etc. As another example, audio content may be saved as a stereo recording, a mono recording or other audio capture modes.

A user typically selects the capture mode prior to capture of the content. For example, a user may be presented with a listing of the capture modes that are available. In response to the listing of available capture modes, the user may select a respective capture mode and may then initiate capture of the content in accordance with the selected capture mode. Alternatively, the user may select an application associated with a respective capture mode prior to the capture of the content with the content thereafter being captured and saved in accordance with the content capture mode of the application previously selected by the user.

BRIEF SUMMARY

A method, apparatus and computer program product are provided in accordance with an example embodiment of the present invention to permit the capture mode to be determined following the capture of the content. By determining the capture mode following the capture of the content, the capture of the content may be initiated more quickly such that content that is transient or otherwise fleeting may be captured while still preserving the wide variety of options in terms of the capture mode according to which the content may be saved. By determining the capture mode following the capture of the content, the capture modes that are most relevant to the content that has been captured may be determined such that the user may select the capture mode in a more efficient manner by only being presented with the relevant capture modes. As such, the method, apparatus and computer program product of an example embodiment may facilitate both the capture of content and the determination of the capture mode in accordance with which the content will be saved so as to improve the overall user experience.

In an example embodiment, a method is provided that includes providing for content to be captured, such as without an indication of the capture mode. Following capture of the content, the method includes determining one or more candidate capture modes from a plurality of capture modes based upon information associated with the content that has been captured. The method of this example embodiment also includes causing the one or more candidates capture modes to be presented to a user for selection.

The method of an example embodiment may also include causing, in response to user selection of a candidate capture mode, at least some of content to be saved in accordance with the candidate capture mode that has been selected by the user. In an example embodiment, the method may determine one or more candidate capture modes based upon a relationship between characteristics associated with the content and the plurality of capture modes. The method of an example embodiment may also determine one or more candidate capture modes based upon at least one of the content that was captured, information extracted from the content that was captured or information related to the content that was captured. The one or more candidate capture modes may include less than all of the plurality of capture modes.

In another example embodiment, an apparatus is provided that includes at least one processor and at least one memory including computer program code with the at least one memory and the computer program code configured to, with the processor, cause the apparatus to at least provide for content to be captured, such as without an indication of the capture mode. The at least one memory and the computer program code may also be configured to, with the processor, cause the apparatus of this example embodiment, to determine, following capture of the content, one or more candidate capture modes from a plurality of capture modes based upon information associated with the content that has been captured. The at least one memory and the computer program code are also configured to, with the processor, cause the apparatus of this example embodiment to cause the one or more candidate capture modes to be presented to a user for selection.

The at least one memory and the computer program code may be further configured to, with the processor, cause the apparatus of an example embodiment to cause, in response to user selection of a candidate capture mode, at least some of the content to be saved in accordance with the candidate capture mode selected by the user.

The at least one memory and the computer program may be configured to, with the processor, cause the apparatus of an example embodiment to determine one or more candidate capture modes based upon a relationship between characteristics associated with the content and the plurality of capture modes. The at least one memory and computer program code may be configured to, with the processor, cause the apparatus of an example embodiment to determine one or more candidate capture modes based upon at least one of the content that was captured, information extracted from the content that was captured or information related to the content that was captured. The one or more candidate capture modes may include less than all of the plurality of capture modes.

In a further example embodiment, an apparatus is provided that includes means for providing for content to be captured, such as without an indication of the capture mode. The apparatus of this example embodiment also includes means for determining, following capture of the content, one or more candidate capture modes from a plurality of capture modes based upon the information associated with the content that has been captured. In accordance with this example embodiment, the apparatus also includes means for causing the one or more candidate capture modes to be presented to a user for selection.

The apparatus of an example embodiment may also include means for causing, in response to user selection of the candidate capture mode, at least some of the content to be saved in accordance with the candidate capture mode selected by the user. The means for determining one or more candidate capture modes may include means for determining the one or more candidate capture modes based upon a relationship between characteristics associated with the content and the plurality of capture modes. The means for determining one or more candidate capture modes may include means for determining one or more capture modes based upon at least one of the content that was captured, information extracted from the content that was captured or information related to the content that was captured. The one or more candidate capture modes may include less than all of the plurality of capture modes.

In yet another example embodiment, a computer program product is provided that includes at least one non-transitory computer-readable storage medium having computer-executable program code instructions stored therein with the computer-executable program code instructions including program code instructions for providing for content to be captured, such as without an indication of the capture mode. The computer-executable program code instructions of this example embodiment also include program code instructions for determining, following capture of the content, one or more candidate capture modes from a plurality of capture modes based upon information associated with the content that has been captured. The computer-executable program code instructions of this example embodiment also include program code instructions for causing the one or more candidate capture modes to be presented to a user for selection.

The computer-executable program code instructions may also include program code instructions for causing, in response to user selection of the candidate capture mode, at least some of the content to be saved in accordance with the candidate capture mode selected by the user. The program code instructions for determining one or more candidate capture modes may include program code instructions for determining one or more candidate capture modes based upon a relationship between characteristics associated with the content and the plurality of capture modes. In an example embodiment, the program code instructions for determining one or more candidate capture modes may include program code instructions for determining one or more candidate capture modes based upon at least one of the content that was captured, information extracted from the content that was captured or information related to the content that was captured. The one or more candidate capture modes may include less than all of the plurality of capture modes.

BRIEF DESCRIPTION OF THE DRAWINGS

Figure 1:
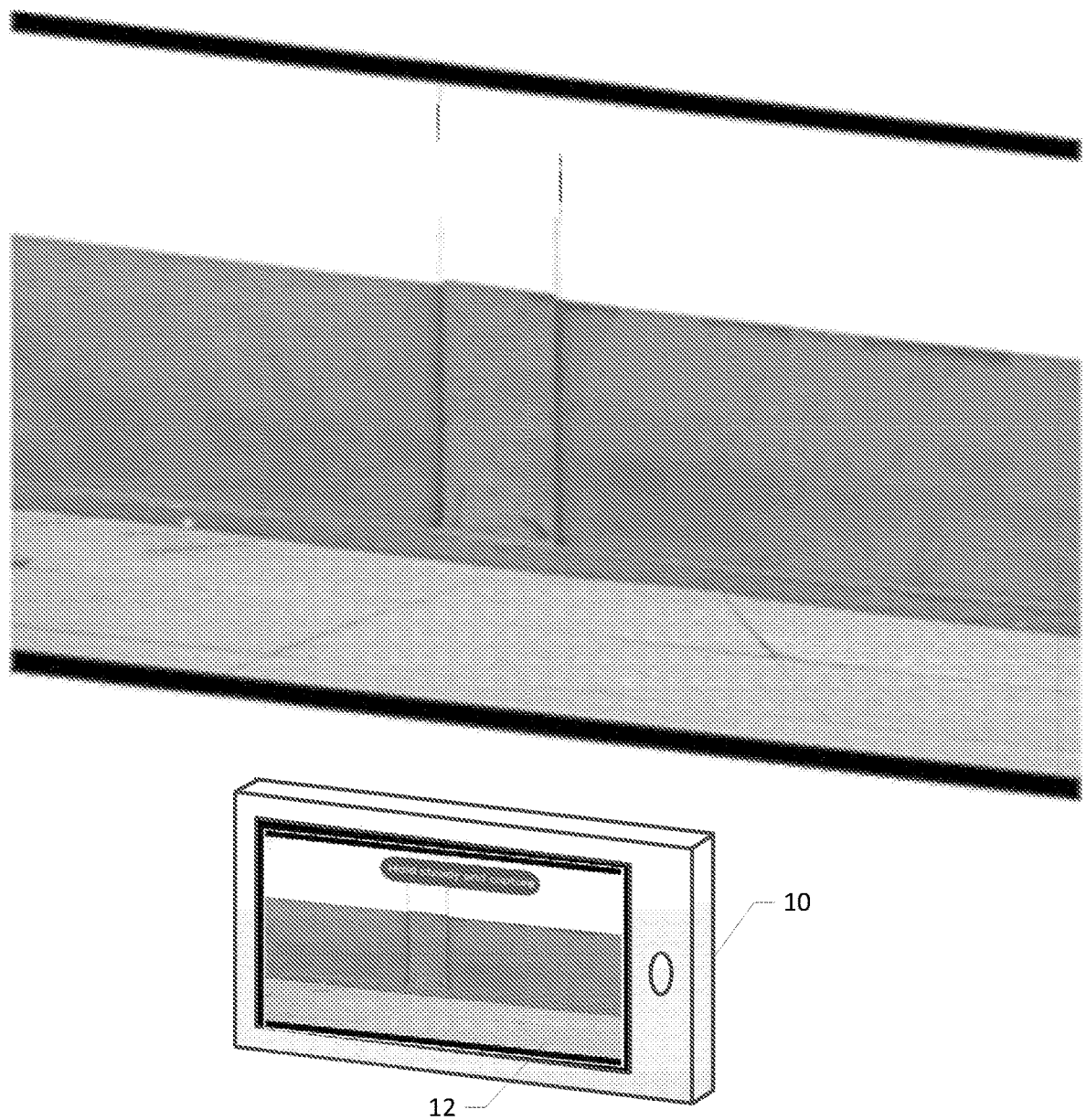
Figure 2:
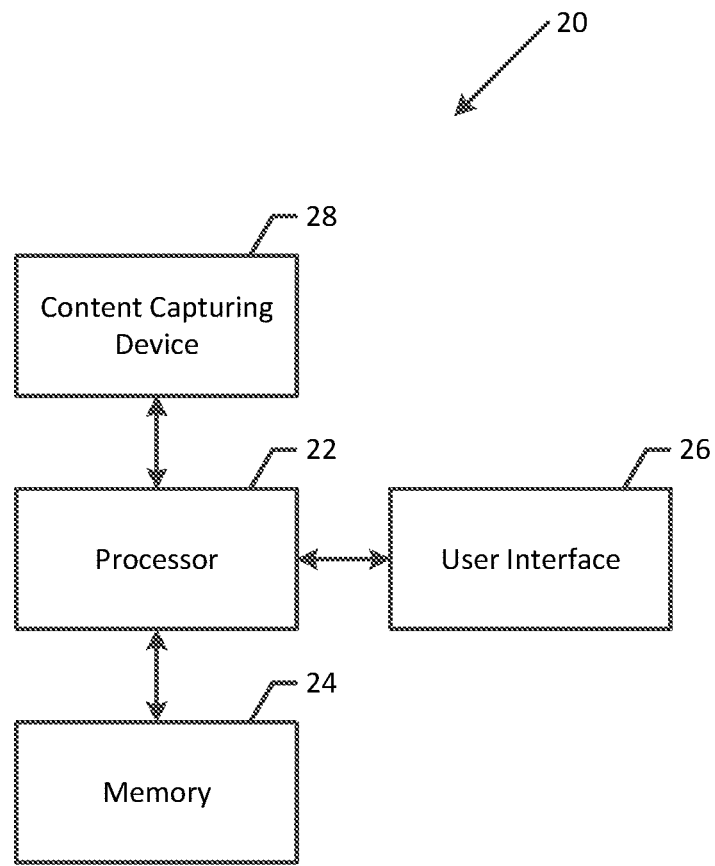
Figure 3:
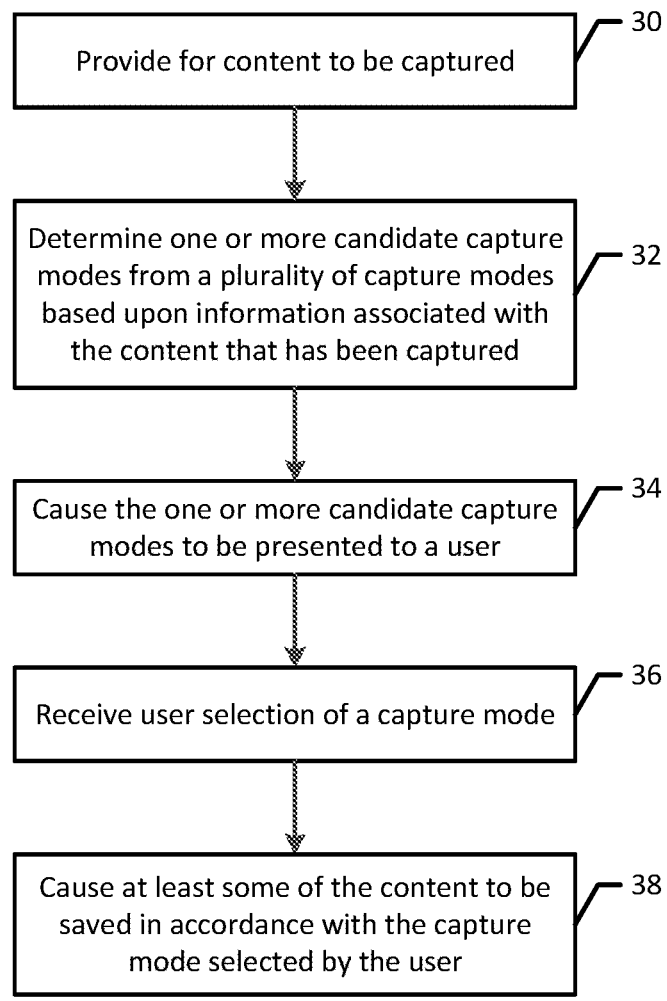
Figure 4:
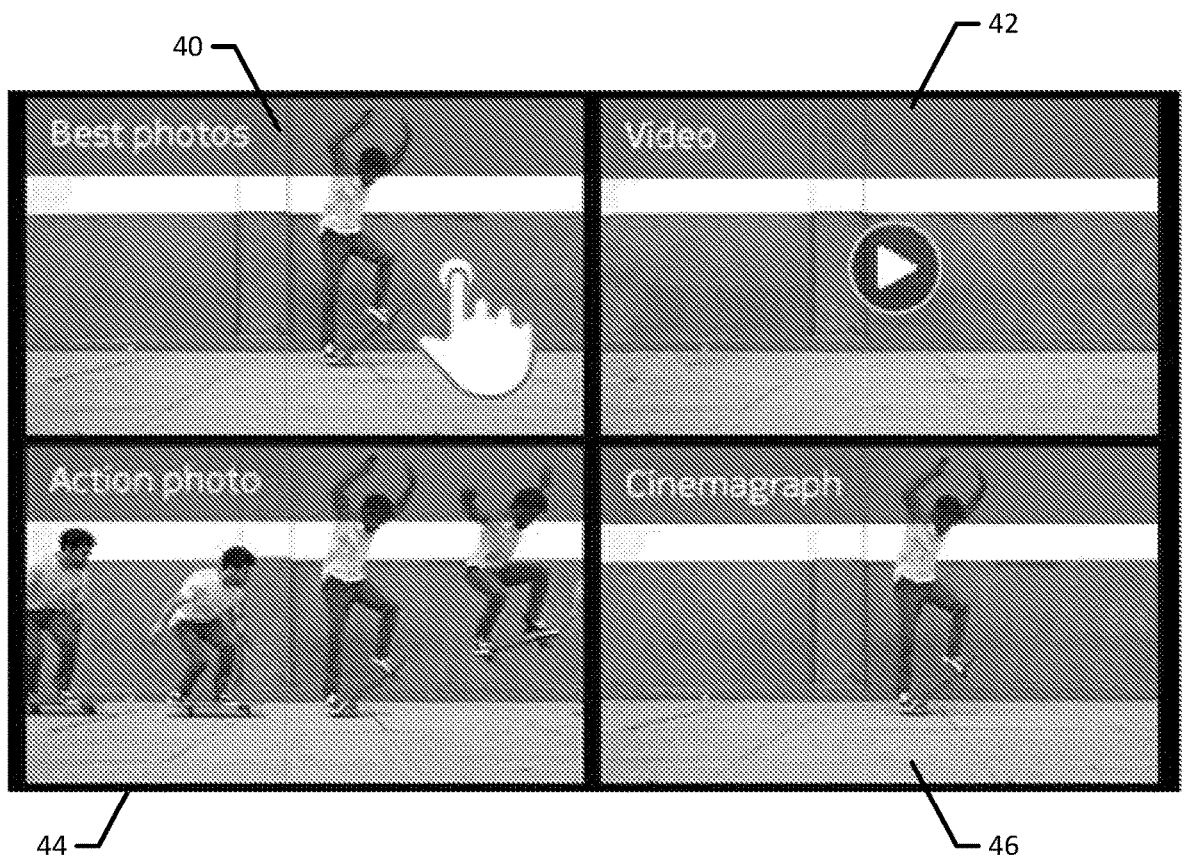
Figure 5:
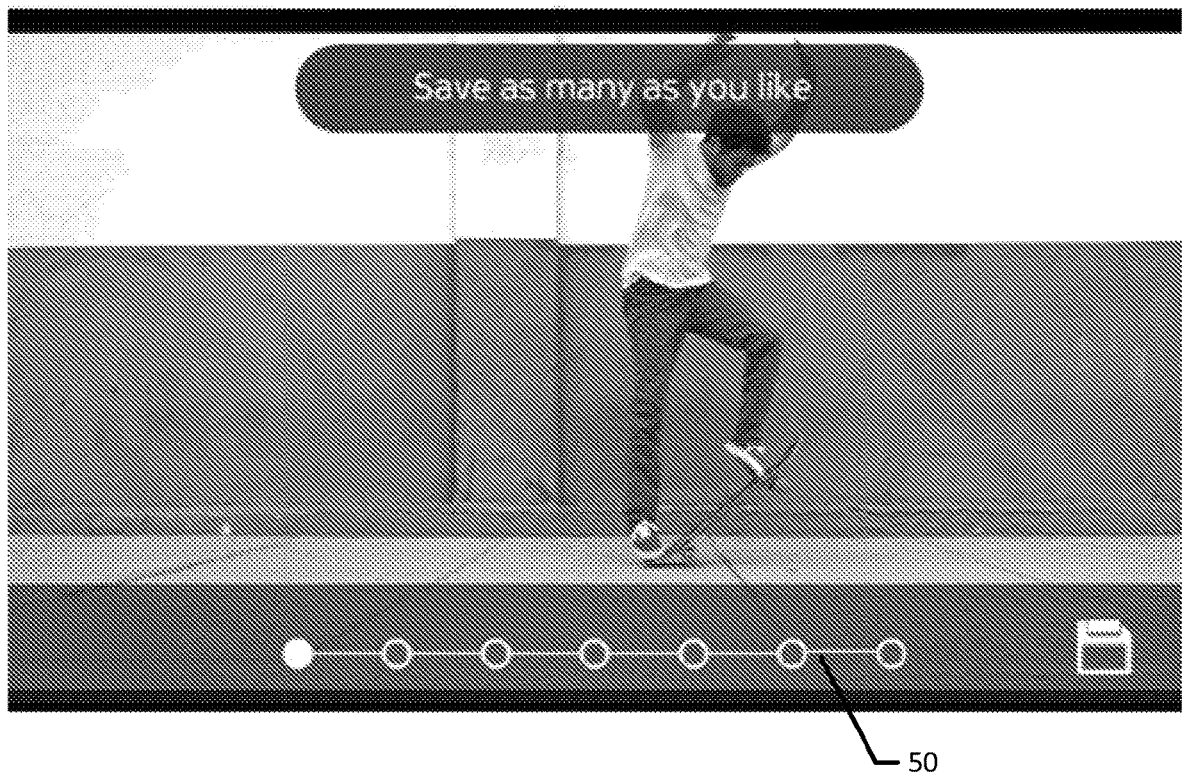
Figure 6:
Figure 7:
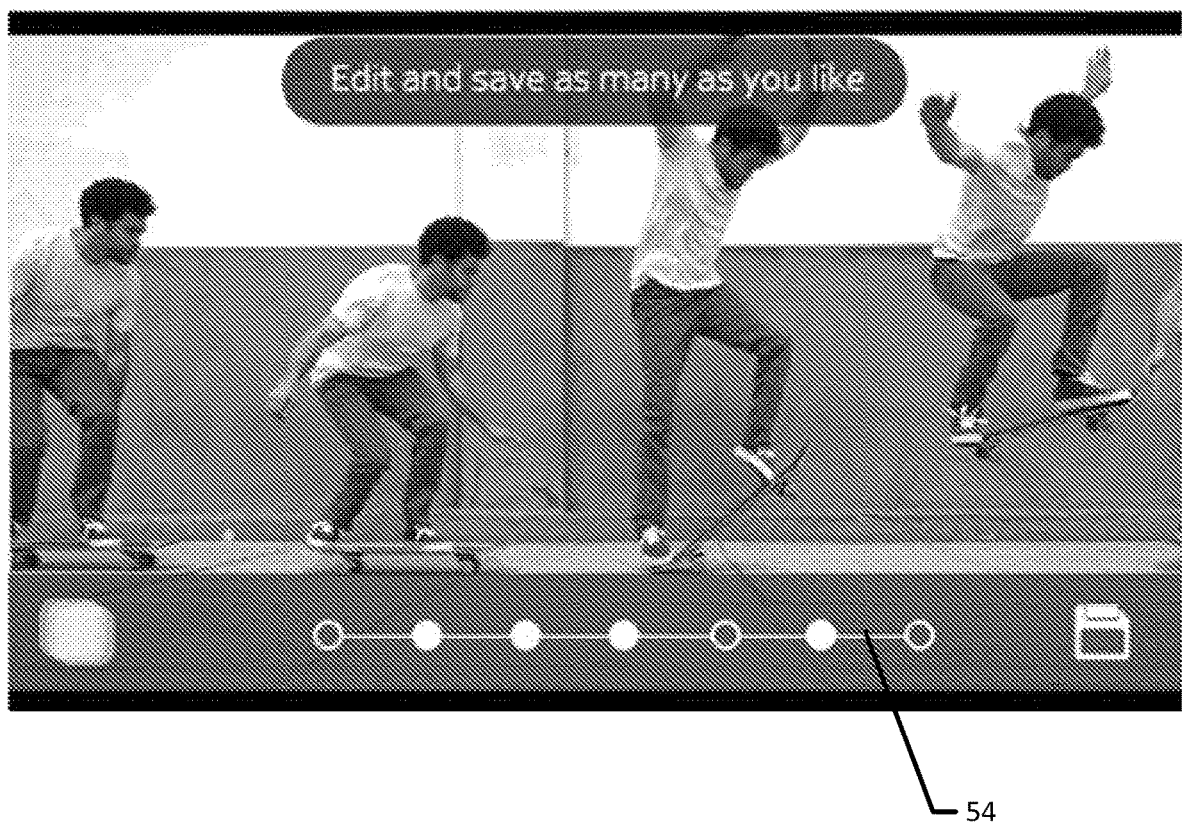
Figure 8:
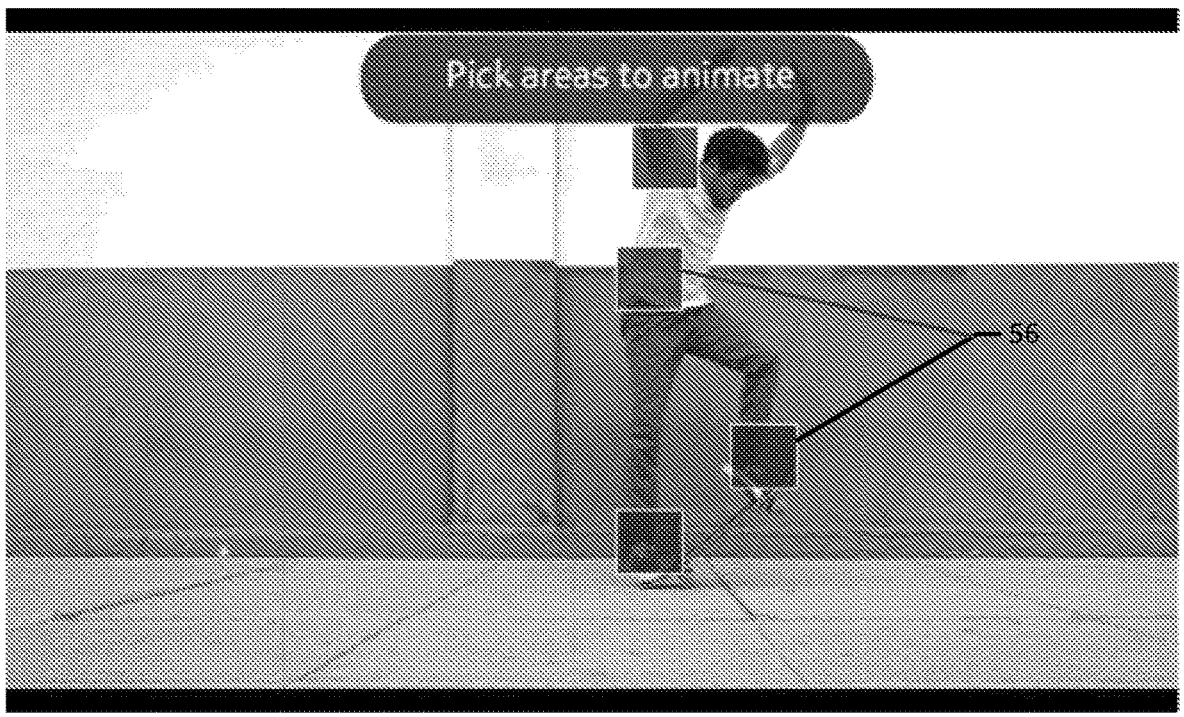

Having thus described certain embodiments of the invention in general terms, reference will now be made to the accompanying drawings, which are not necessarily drawn to scale, and wherein:

FIG. 1 is a perspective view of an electronic device that includes an image recording device, such as a camera, for capturing an image and that may be specifically configured in accordance with an example embodiment of the present invention;

FIG. 2 is a block diagram of an apparatus that may be specifically configured in accordance with an example embodiment of the present invention;

FIG. 3 is a flowchart illustrating operations performed, such as by the apparatus of FIG. 2, in accordance with an example embodiment of the present invention;

FIG. 4 is an image that may be presented to identify a plurality of candidate capture modes following capture of the content in accordance with an example embodiment of the present invention;

FIG. 5 is an image representative of the best photo capture mode that may be selected in accordance with an example embodiment of the present invention;

FIG. 6 is an image representative of the video capture mode that may be selected in accordance with an example embodiment of the present invention;

FIG. 7 is an image representative of the action photo capture mode that may be selected in accordance with an example embodiment of the present invention; and FIG. 8 is an image representative of the cinemagraph capture mode that may be selected in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Prior to capturing content, a user may be required to identify the capture mode. With respect to the capture of images, for example, the user may be required to identify whether the images are to be captured in accordance with a still image capture mode, a video capture mode, a best photo capture mode, an action photo capture mode, a cinemagraph capture mode or the like. The selection of the capture mode may delay the initiation of the actual capturing of content with the potential delay only increasing as the number of capture modes continues to increase. In some instances, the delay in the initiation of the capturing of content is undesired as the subject matter of interest may be transient or otherwise fleeting in nature such that the requisite selection of a capture mode prior to the initiation of content capture may cause the resulting content that is captured to lack some or all of the subject matter of interest. For example, when a child first learns to walk, a user attempting to capture video of the child's first steps may be frustrated in an instance in which the delay in filming incurred to select the capture mode causes the video that is captured to commence after the child has taken their first step.

Additionally, a user who is required to select the capture mode may need to understand the features, advantages and disadvantages of the various captures modes in order to make an informed selection and to cause the content that is captured to be saved in accordance with the preferable capture mode. However, a number of users do not invest the time or have an interest to learn the details associated with the various capture modes. This disinclination of users to understand the various capture modes is also only heightened as the number of capture modes increases.

A method, apparatus and computer program product are therefore provided in accordance with an example embodiment of the present invention to permit content to be captured without first selecting a capture mode and to, instead, permit the capture mode to be determined following the capture of content. In this manner, the initiation of the capture of content may commence more quickly so as to facilitate the capture of content that is transitory or fleeting in nature. Further, by determining the capture mode following the capture of the content, the capture modes that are most relevant for the content that has been captured may be determined so as to facilitate the user selection of the capture mode and to increase the likelihood that a relevant capture mode is selected.

By facilitating the selection of the capture mode after having captured the content, the method, apparatus and computer program product of an example embodiment may facilitate user selection of an appropriate capture mode, thereby reducing the likelihood that the user will repeat the process of capturing the content in accordance with a different capture mode and correspondingly conserving the processing resources otherwise expended by repeating the capturing of the content. Further, the determination of the most relevant capture modes following the capture of the content in accordance with an example embodiment of the present invention may also simplify the user selection of the capture mode such that fewer processing resources are expended interacting with the user during the selection of the capture mode.

FIG. 1 depicts an electronic device 10 configured to capture content, such as the background scene through which a skateboarder will subsequently skate. In this example embodiment, the electronic device may be embodied as a smartphone or other mobile telephone that includes an image recording device, such as a camera, for capturing video images of a subject. As shown, the smartphone or other mobile telephone of this example embodiment may include a display 12 that also serves as the camera viewfinder so as to present the image to be captured. As described below, the smartphone or other mobile telephone may be configured to facilitate selection of the capture mode in accordance with an example embodiment of the present invention. However, a wide variety of electronic devices that capture content may be configured to facilitate selection of the capture mode in accordance with an example embodiment of the present invention. For example, the electronic device may alternatively be embodied as a digital camera, a video recorder, an audio recorder, a tablet computer, a laptop computer, a personal computer or the like. Regardless of the type of electronic device, the electronic device may include a device for capturing content. For example, the electronic device may include an image recording device, such as a camera, for capturing one or more images, an audio recording device, such as one or more microphones, for capturing audio content or the like.

As shown in FIG. 2, an apparatus 20 that may be specifically configured in accordance with an example embodiment of the present invention is depicted. The apparatus may be embodied by, be associated with or be in communication with an electronic device 10 that is configured to capture content, such as depicted in FIG. 1. As such, the apparatus may be embodied by the same electronic device that is configured to capture the content or the apparatus may be in association with the electronic device that captures the content so as to receive the content captured by the electronic device, either directly from the electronic device or following storage of the content in a memory device. Regardless of its embodiment, the apparatus may be configured to facilitate selection of the capture mode by the user.

The apparatus 20 may include, be associated with or otherwise in communication with a processor 22, a memory device 24, a user interface 26 and optionally a content capturing device 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by an electronic device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 26. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 22 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

As noted above, the apparatus 20 need not be embodied by the electronic device 10 that is configured to capture the content, but may, instead, be associated with or in communication with the electronic device so as to have access to the content that is captured. However, in some example embodiments such as in instances in which the apparatus is embodied by the electronic device, the apparatus may optionally include a content capturing device 28, such an image recording device, e.g., a camera, a video recorder or the like, a sound recording device, e.g., one or more microphones, or the like. In regards to an image capturing device, the image capturing device may be any means for obtaining an image, such as a still image, video images or the like, for storage, display or transmission including, for example, an image sensor. For example, the image capturing device may include a digital camera including an image sensor capable of obtaining an image. As such, the image capturing device may include all hardware, such as a lens, an image sensor and/or other optical device(s), and software necessary for capturing an image. Alternatively, the image capturing device may include only the hardware needed to view an image, while the memory stores instructions for execution by the processor in the form of software necessary to capture, store and process an image. In an example embodiment, the image capturing device may further include a processing element such as a co-processor which assists the processor in processing image data and an encoder and/or decoder for compressing and/or decompressing image data. The encoder and/or decoder may encode and/or decode according to a predefined format, such as a JPEG standard format. The image that is captured may be stored for future viewings and/or manipulations in the memory of the apparatus and/or in a memory external to the apparatus. The image capturing device may also include or otherwise be associated with, e.g., in communication with, a viewfinder, such as depicted in FIG. 1, for presenting at least a portion of the image obtained by the image capturing device.

Referring now to FIG. 3, the operations performed, such as by the apparatus 20 of FIG. 2, are depicted. As shown in block 30, the apparatus may include means, such as the processor 22, the content capturing device 28 or the like, for providing for content to be captured. As shown in FIG. 1, for example, the content may be one or more images, such as a still image, a video or the like. However, other types of content may be captured including audio content, audio/video content or the like. Regardless of the type of content, the content may be captured in accordance with an example embodiment without an indication of the capture mode, that is, without a selection by the user or otherwise of the capture mode, that defines the format in which the content is to be saved. With respect to video content, for example, capture modes may include a video capture mode, a still image capture mode, a cinemagraph capture mode, a best photo capture mode, an action photo capture mode, etc. As another example, capture modes for audio content may include a stereo recording capture mode, a mono recording capture mode, a high bit rate capture rate, a low bit rate capture rate, as well as other audio capture modes.

The apparatus 20 also includes means, such as the processor 22 or the like, for determining, following the capture of the content, one or more candidate capture modes from a plurality of capture modes based upon the information associated with the content that has been captured. See block 32 of FIG. 3. In this regard, a plurality of capture modes may be available. From the plurality of capture modes that are available, the apparatus, such as the processor, may determine, following capture of the content, a subset of those capture modes to be the candidate capture modes that may be further considered, such as by the user, in the selection of the capture mode for the content that has been captured. The candidate capture modes generally do not include all of the capture modes that are available, but are, instead, less in number.

The apparatus 20, such as the processor 22, may be configured to determine the one or more candidate capture modes to be those capture modes from among the plurality of capture modes that are available that are most relevant with respect to the content that has been captured. The relevancy of a capture mode to the content that has been captured may be defined in various manners. In an example embodiment, however, each of the plurality of capture modes may include one or more characteristics and the content that is captured may likewise include one or more characteristics. As such, the apparatus, such as the processor, may be configured to determine the one or more candidate capture modes based upon a relationship between characteristics associated with the content and the plurality of capture modes, such as by determining the candidate capture modes to be those that have a predefined number of characteristics in common (either identical or within a predefined range of one another) with the content that has been captured.

In this example embodiment, the capture modes and the content may have a wide variety of characteristics associated therewith. In the context of video content, these characteristics may include the inclusion of a particular person or of multiple faces as determined by face detection, the presence of a predefined expression, such as a smile, upon the face(s) of the subjects of the image as determined by expression, e.g., smile, detection, the inclusion of a child as determined by age detection, an object in motion, the user designation of one or more images as being of particular interest or the like.

By way of example of the characteristics that may be considered in regards to determining the most relevant capture modes, a video of a group of individuals may be captured. During the capturing of the video, the photographer may designate a respective image in which one or more of the individuals smile, such as my touching the touchscreen of a view finder. The respective image of the video that was designated by the photographer to be of particular relevance may be included in the information analyzed by the apparatus 20, such as the processor 22, in determining the one or more candidate capture modes. In this regard, the apparatus, such as the processor, may determine that a characteristic of the respective image that was designated to be of particular significance is that one or more of the individuals began to smile. As such, the apparatus, such as the processor, may be configured to review the images that comprise of video and to identify the image in which the greatest number of people within the image have the same expression, that is, are smiling. Alternatively, the apparatus, such as the processor, may construct a composite image from portions of different images of the video such that the resulting composite images include more people smiling than in any of the individual images.

In this example embodiment, the characteristics associated with the content that was captured that are considered by the apparatus 20, such as the processor 22, in determining the candidate capture modes may include the presence of multiple faces of people, e.g., a group, as defined by face detection and the expressions, such as the smiles, on the faces of the people as identified by smile or other expression detection. Based upon these characteristics, the apparatus, such as the processor, may identify candidate capture modes that have characteristics consistent with, e.g., the same as or similar to by being within a predetermined range of, the characteristics of the content that has been capture. For example, the apparatus, such as the processor, of this example embodiment may determine the candidate capture modes to include a still image capture mode, a video capture mode and an animated graphics interchange format (GIF) capture mode as also having characteristics that are consistent with the one or more of the characteristics of the content that was captured.

As another example, a video of a baby who is beginning to crawl may be captured. The photographer may indicate certain images within the video as being of particular interest, such as by tapping a touch screen viewfinder upon which the images are presented during capture. In this regard, the photographer may indicate that the images associated with the commencement of crawling and the time at which the toddler reaches their parent to be of particular interest. The apparatus 20, such as the processor 22, of this example embodiment may identify the subject to be a baby, such as a result of face recognition and age recognition. In addition, the apparatus, such as the processor, may detect movement of the subject and corresponding movement of the image recording device so as to track the subject. As such, the apparatus, such as the processor, may identify that the movement of the subject is of importance. Thus, the apparatus, such as the processor, may identify the presence of the baby and the movement of the baby to be characteristics of the content that has been captured. Based upon these characteristics, the apparatus, such as the processor, may also identify one or more candidate capture modes that have the same or similar characteristics including, for example, a best photo capture mode, an action photo capture mode and a video capture mode.

As the foregoing examples illustrate, the apparatus 20, such as the processor 22, may be configured in accordance with an example embodiment to determine the one or more candidate capture modes based upon at least one of the content that was captured, information extracted from the content that was captured or information related to the content that was captured, all of which may provide characteristics associated with the content. In regards to the determination of one or more candidate capture modes based upon the content that was captured and in an example in which video content is captured, the apparatus, such as the processor, may determine whether a single image or a time sequence of images were captured which may, in turn, define whether the candidate capture mode is a still image capture mode or a video capture mode, respectively. In addition, the apparatus, such as the processor, may be configured to extract information from the content that was captured or to receive information that has been extracted from the content that was captured. A variety of information may be extracted from the content, such as via object recognition, face detection, motion detection, sound detection, etc. including the identification of faces through face detection, the identification of expressions through smile or other expression detection, the identification of movement and associated parameters such as direction, speed or the like, etc. Additionally, a variety of information related to the content that was captured may be referenced by the apparatus, such as the processor, in regards to the determination of the one or more candidate capture modes. The information related to the content that was captured may be provided, for example, as metadata. For example, the metadata may define the location of the content capturing device at the time the content was captured, may indicate whether the content capturing device was stationary or was moved during the period of time during which content was captured, may define the length of the period of time during which content was captured, etc. In this regard, the movement of the content capturing device while the content is captured may be referenced by the apparatus, such as the processor, in regards to the determination of the one or more candidate capture modes since an action photo capture mode and a cinemagraph capture mode require the image capturing device to point to the same location throughout the capturing of the content, while a still image capturing mode and a video capturing mode permit the image capturing device to be moved freely while capturing the content.

As shown in block 34, the apparatus 20 may also include means, such as the processor 22, the user interface 26 or the like, for causing the one or more candidate capture modes to be presented to a user for selection. The one or more candidate capture modes may be presented in various manners including as a list of candidate capture modes or as separate icons, thumbnails, window panes or the like as described below. The apparatus may also include means, such as the processor, the user interface or the like, for receiving the user selection of a candidate capture mode. See block 36 of FIG. 3. The apparatus may also include means, such as the processor, the memory 24 or the like, for causing, in response to user selection of a candidate capture mode, at least some of the content to be saved in accordance with the candidate capture mode selected by the user. See block 38.

By receiving the user selection of the capture mode following the capture of the content, the user may have more time and be less hurried in their selection of the capture mode than in instances in which the user was required to select the capture mode prior to the capture of the content, which could be time sensitive as described above. Further, by presenting only the candidate capture mode(s) that are determined to be most relevant to the content that has been captured, a user must only consider a subset of all of the available capture modes, thereby permitting selection of the capture mode to be more efficiently made and with an increased likelihood that the user will select a relevant capture mode for the content that has been captured. As a result of the selection of the capture mode after the capture of the content, however, content may be captured that is thereafter not saved in conjunction with the capture mode that is selected. As such, more content may be captured than is eventually saved in conjunction with the selected capture mode. For example, a video recorder may record video images of a subject, but the subsequent selection of a still image capture may cause only a single still image, and not the other video images, to be stored.

By way of example, an electronic device 10, such as the depicted in FIG. 1, may capture video content of a skateboarder. Following the capture of the video images of the skateboarder, the apparatus 20, such as the processor 22, may be configured to determine the candidate capture mode (s) from the plurality of available capture modes. In this example, the apparatus, such as the processor, may determine, based upon the metadata associated with the content that was captured, that the image recording device was pointed in the same direction throughout the capture of the content, the candidate capture modes may include not only a still image capture mode and a video capture mode, but also a best photo capture mode, an action photo capture mode and a cinemagraph capture mode.

In this example, the apparatus 20, such as the processor 22, the user interface 26 or the like, may cause the candidate capture modes to be presented to the user for selection. As shown in FIG. 4, for example, window panes including a representative image of each candidate capture mode may be presented and the user may, in turn, select one or more of the candidate capture modes. In the example embodiment of FIG. 4, the candidate capture modes include a best photo capture mode 40, a video capture mode 42, an action photo capture mode 44 and a cinemagraph capture mode 46. In other embodiments, the candidate capture modes may be presented to the user for selection in other manners.

Upon selection of the best photo capture mode 40, the apparatus 20, such as the processor 22, the user interface 26 or the like, may present one of the best photos and permit the user to select up to a predefined number of best photos to be saved. The apparatus, such as the processor, may determine the best photos from the video images in various manners including identification of images that are captured at different, temporally spaced instances throughout the period of time in which the video was captured and/or the identification of images that are most reflective of different poses that occur during the period of time during which the video was captured. In the example of FIG. 5, seven photos organized in time sequence have been identified by the processor as best photo candidates. Each best photo candidate may be represented by a respective designation, such as an open circle 50 in the embodiment of FIG. 5. By selecting a designation associated with a best photo candidate, a user may view the best photo candidate and determine which ones should be saved in accordance with the best photo capture mode.

Upon selection of the video capture mode 42, the apparatus 20, such as the processor 22, the user interface 26 or the like, may present an image, such as the first image, of the video recording, as shown in FIG. 6. In the illustrated embodiment, one or more icons may also be presented that permit the user to control the playback of the video, such as the play icon 52 of FIG. 6.

The action photo capture mode 44 permits a plurality of images of a subject to be presented in time sequence in front of the same, stationary background. Upon selection of the action photo capture mode, the user may define the number of images of the subject to be included and, in some instances, may select the images to be included in the action photo. For example, the apparatus, such as the processor, may determine the action photo candidates from the video images in various manners including identification of images that are captured at different, temporally spaced instances throughout the period of time in which the video was captured and/or the identification of images in which the subject has undergone the greatest movement relative to the adjacent images. In the example of FIG. 7, seven photos organized in time sequence have been identified by the processor as action photo candidates. Each best photo candidate may be represented by a respective designation, such as an open circle 54 in the embodiment of FIG. 7. By selecting a designation associated with an action photo candidate, a user may view the an action photo candidate and determine which ones should be included in and saved as the resulting action photo, such as shown in FIG. 7.

Further, a cinemagraph permits one or more areas of an image to be animated while the other portions of the image remain stationary. In the example embodiment depicted in FIG. 8 following selection of the cinemagraph mode 46, the apparatus 20, such as the processor 22, the user interface 26 or the like, may present an image, such as a respective one of the best images, and may be configured to receive user input designating one or more areas to be animated. In the embodiment of FIG. 8, the user has designated four regions 56 to be animated. The apparatus, such as the processor, of this example embodiment may also be configured to animate the regions designated by the user by incorporating the movement of the respective regions as captured in the other images of the same subject, while the remainder of the image remains stationary.

While several examples are provided above in regards to the candidate capture modes that may be identified in response to the capture of video content, other candidate capture modes may be identified by the method and apparatus in other embodiments including both other capture modes for video content and capture modes for other types of content, such as audio content.

As described, the method, apparatus 20 and computer program product of an example embodiment of the present invention permit the capture mode to be determined following the capture of the content. By determining the capture mode following the capture of the content, the capture of the content may be initiated more quickly. Thus, the user may more consistently capture content that is transient or otherwise fleeting while still preserving a wide variety of options in terms of the capture mode according to which the content may be saved. By determining the capture mode following the capture of the content, the capture modes that are most relevant to the content that has been captured may be determined. Thus, the user may select the capture mode in a more efficient manner by only being presented with the relevant capture modes, thereby improving the overall user experience in at least some embodiments.

As described above, FIG. 3 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    providing for content to be captured and stored in a memory of a device;
    in response to capture and storage of the content, determining two or more candidate capture modes from a plurality of capture modes based upon information associated with the content that has been captured;
    further in response to the capture and storage of the content, causing two or more selectable thumbnails to be displayed, each thumbnail being associated with a respective candidate capture mode, and each thumbnail providing a snapshot preview associated with the respective candidate capture mode
    receiving an indication of a user selection of one of the selectable thumbnails;
    in response to receiving the indication of the user selection of one of the selectable thumbnails, providing a preview of the content, manipulated according to the respective candidate capture mode associated with the selected thumbnail; and
    in response to a user input indicating to save additional manipulated content associated with the selected thumbnail, storing the manipulated content or additionally manipulated content associated with the selected thumbnail.

2. A method according to claim 1 wherein determining two or more candidate capture modes comprises determining two or more candidate capture modes based upon a relationship between characteristics associated with the content and the plurality of capture modes.

3. A method according to claim 1 wherein determining two or more candidate capture modes comprises determining two or more candidate capture modes based upon at least one of the content that was captured, information extracted from the content that was captured or information related to the content that was captured.

4. A method according to claim 1 wherein the two or more candidate capture modes include less than all of the plurality of capture modes, wherein the plurality of capture modes comprises three or more candidate capture modes.

5. A method according to claim 1 wherein providing for content to be captured comprises providing for content to be captured without an indication of the capture mode.

6. A method according to claim 1, wherein the plurality of capture modes comprises at least one of a still image capture mode, a video capture mode, a best photo capture mode, an action photo capture mode, an animated graphics interchange format (GIF) capture mode, a cinemagraph capture mode, a stereo recording capture mode, a mono recording capture mode, a high bit rate capture mode, or a low bit rate capture mode.

7. The method according to claim 1, wherein the captured and stored content is video content, and at least one of the two or more candidate capture modes comprises a best photos mode, and the method further comprises:
  generating the preview of the content associated with the best photos mode by extracting a plurality of images from the video content.

8. The method according to claim 1, wherein the captured and stored content is video content, and at least one of the two or more candidate capture modes comprises an action photo mode, and the method further comprises:
  generating the preview of the content associated with the action photo mode by extracting a plurality of images from the video content and combining at least a subset of the plurality of images as an action shot.

9. The method according to claim 1, wherein the captured and stored content is video content, and at least one of the two or more candidate capture modes comprises a cinemagraph mode, and the method further comprises:
  generating the preview of the content associated with the cinemagraph mode by generating a cinemagraph video image from the plurality of images, the cinemagraph video image comprising at least one stationary portion, and at least one animated portion.

10. A method according to claim 9, further comprising: receiving user input designating one or more areas of the presented image to be animated.

11. An apparatus comprising at least one processor and at least one memory including computer program code, the at least one memory and the computer program code configured to, with the processor, cause the apparatus to at least:
  provide for content to be captured and stored in the at least one memory;
  in response to capture and storage of the content, determine two or more candidate capture modes from a plurality of capture modes based upon information associated with the content that has been captured;
  further in response to the capture and storage of the content, cause two or more selectable thumbnails to be displayed, each thumbnail being associated with a respective candidate capture mode, and each thumbnail providing a snapshot preview associated with the respective candidate capture mode;
  receive an indication of a user selection of one of the selectable thumbnails;
  in response to receiving the indication of the user selection of one of the selectable thumbnails, provide a preview of the content, manipulated according to the respective candidate capture mode associated with the selected thumbnail; and
  in response to a user input indicating to save additional manipulated content associated with the selected thumbnail, store the manipulated content or additionally manipulated content associated with the selected thumbnail.

12. An apparatus according to claim 11 wherein the at least one memory and the computer program code are configured to, with the processor, cause the apparatus to determine two or more candidate capture modes by determining two or more candidate capture modes based upon a relationship between characteristics associated with the content and the plurality of capture modes.

13. An apparatus according to claim 11 wherein the at least one memory and the computer program code are configured to, with the processor, cause the apparatus to determine two or more candidate capture modes by determining two or more candidate capture modes based upon at least one of the content that was captured, information extracted from the content that was captured or information related to the content that was captured.

14. An apparatus according to claim 11 wherein the two or more candidate capture modes include less than all of the plurality of capture modes, wherein the plurality of capture modes comprises three or more candidate capture modes.

15. An apparatus according to claim 11 wherein the at least one memory and the computer program code are configured to, with the processor, cause the apparatus to provide for content to be captured by providing for content to be captured without an indication of the capture mode.

16. A computer program product comprising at least one non-transitory computer-readable storage medium having computer-executable program code instructions stored therein, the computer-executable program code instructions comprising program code instructions for:
  providing for content to be captured and stored in a memory of a device;
  in response to capture and storage of the content, determining two or more candidate capture modes from a plurality of capture modes based upon information associated with the content that has been captured;
  further in response to the capture and storage of the content, causing two or more selectable thumbnails to be displayed, each thumbnail being associated with a respective candidate capture mode, and each thumbnail providing a snapshot preview associated with the respective candidate capture mode;
  receiving an indication of the user selection of one of the selectable thumbnail;
  in response to receiving the indication of the user selection of one of the selectable thumbnails, providing a preview of the content, manipulated according to the respective candidate capture mode associated with the selected thumbnail; and
  in response to a user input indicating to save additional manipulated content associated with the selected thumbnail, storing the, manipulated content or additionally manipulated content associated with the selected thumbnail.

17. A computer program product according to claim 16 wherein the program code instructions for determining two or more candidate capture modes comprise program code instructions for determining two or more candidate capture modes based upon a relationship between characteristics associated with the content and the plurality of capture modes.

18. A computer program product according to claim 16 wherein the program code instructions for determining two or more candidate capture modes comprise program code instructions for determining two or more candidate capture modes based upon at least one of the content that was captured, information extracted from the content that was captured or information related to the content that was captured.

19. A computer program product according to claim 16 wherein the two or more candidate capture modes include less than all of the plurality of capture modes, wherein the plurality of capture modes comprises three or more candidate capture modes.

* * * * *